Oct. 24, 1950           H. C. GRAY           2,526,945
METHOD OF AND APPARATUS FOR CONTINUOUSLY FORMING
SHAPES OF RESIN IMPREGNATED FABRIC
Filed Dec. 7, 1945           6 Sheets-Sheet 5

Inventor
*Harry C. Gray*

By *Mason, Porter & Diller*
Attorneys

Oct. 24, 1950 H. C. GRAY 2,526,945
METHOD OF AND APPARATUS FOR CONTINUOUSLY FORMING
SHAPES OF RESIN IMPREGNATED FABRIC
Filed Dec. 7, 1945 6 Sheets-Sheet 6

Inventor
Harry C. Gray.
By Mason, Porter & Diller
Attorneys

Patented Oct. 24, 1950

2,526,945

UNITED STATES PATENT OFFICE 2,526,945

METHOD OF AND APPARATUS FOR CONTINUOUSLY FORMING SHAPES OF RESIN IMPREGNATED FABRIC

Harry C. Gray, Chicago, Ill., assignor to Continental Can Company, Inc., New York, N. Y., a corporation of New York Application December 7, 1945, Serial No. 633,509

13 Claims. (Cl. 154—1)

1

The invention relates generally to the art of forming shapes such as channels, angles, V-sections, Z-sections, corrugations or other shapes adapted for various uses, and it primarily seeks to provide a novel method of and apparatus for forming such shapes from resin impregnated fabrics.

I am aware that various shapes have been formed heretofore from resin impregnated fabrics, but to my knowledge all such shapes have been formed in fixed molds in a manner requiring that the assembly, shaping and curing of the shapes be carried out in individual sections of limited length.

Therefore it is an object of the present invention to provide a novel method of and apparatus for continuously forming and curing the shapes so that any desired lengths thereof can be provided.

In its more detailed nature the invention seeks to provide a novel method of the character stated in which one or more webs of fabric are continuously fed through and impregnated with a heat hardening contact pressure resin to form a composite strip which is passed through molding devices first effective to gradually and progressively shape the strip in the intended manner and then to maintain said shape while heat is applied to the impregnated and shaped strip to cure and set the resin.

Another object of the invention is to provide a novel method of the character stated in which the continuously formed shapes are formed in multiples joined along longitudinal lines and including the steps of longitudinally slitting the shaped strip to separate the multiple of strip shapes and cross cutting the multiple of strip shapes into articles of desired length.

Another object of the invention is to provide a novel method of the character stated in which is included the step of encasing the resin impregnated web, or multiple web composite strip, in a cellophane envelope which is effective to exclude air and facilitate movement of the web or strip through the shaping and shape maintaining or curing chambers or cavities of the molding means, the cellophane envelope being stripped off after completion of the articles or shapes.

Another object of the invention is to provide a novel method of the character stated in which the continuously shaped strip may be formed to include at least one relatively coarse or heavy body fabric web such as cotton duck and at least one externally presented lighter and more closely woven web such as muslin, the latter being effective in the molded finished article to facilitate presentation of a smooth external surface.

Another object of the invention is to provide a novel method of the character stated in which the web or strip encasing cellophane envelope is formed by applying a continuous web of cellophane to each face of the resin impregnated web or strip with the cellophane marginal edges extending laterally beyond said web or strip, said extended edges being sealed together to complete the envelope.

Another object of the invention is to provide a novel method of the character stated in which the web is heated either before impregnation in order to facilitate thorough impregnation, or after impregnation and just before entering the molding devices in order to assure fluidity of the resin impregnation during shaping of the web, or both before impregnation and before entering the molding devices for the purposes stated.

Another object of the invention is to provide novel apparatus for performing the various method steps outlined hereinabove.

With the above and other objects in view that will hereinafter appear, the nature of the invention will be more clearly understood by reference to the following detailed description, the appended claims, and the several views illustrated in the accompanying drawings.

In the drawings:

Figures 1$^a$ and 1$^b$, joined at line A—A, together constitute a diagrammatic side elevation illustrating the invention.

In the drawings in which are disclosed the various steps of the novel method, and an example of apparatus by employment of which the method can be practiced, 5 designates a supply roll of fabric such as cotton duck, and 6 designates a second supply roll of fabric such as cotton duck. A third supply roll 7 of fabric such as muslin is provided, and it is to be understood that the roll 7 is so placed that the muslin web will be presented outermost in the composite web or strip to be formed in the manner hereinafter described. It is to be understood also that in the formation of articles in which a smooth external appearance is desired at both sides, two such muslin supplies may be provided and placed so as to apply the muslin web at both sides of the formed article.

Figure 1A:
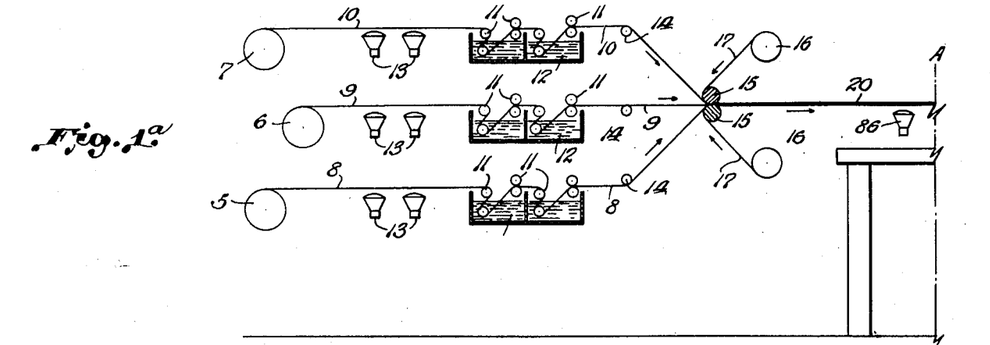

The webs 8, 9 and 10 from the supply rolls respectively designated 5, 6 and 7 are caused by the rolls generally designated 11 to pass through resin impregnating baths 12. If desired, the webs 8, 9 and 10 may be preheated, as by use of infra red ray producing lamps 13 placed in the manner illustrated in Figure 1ª so as to preheat the webs just prior to immersion thereof in the resin impregnating baths 12 so as to facilitate impregnation of the webs. It is to be understood that the resin baths 12 may comprise any suitable heat hardening resin of the contract pressure type, that is a resin mixture of a type that will cure under pressure sufficient to retain the form and contact of the laminae, as distinguished from high pressure setting resins.

After being impregnated in the resin baths 12, the webs 8, 9 and 10 pass over guide rolls 14 and are brought together between assembling rolls 15 in the manner clearly illustrated in Figure 1ª. The cellophane supply rolls 16 are provided above and below the assembling rolls 15, and the two cellophane webs 17 fed from the rolls 16 pass between the assembling rolls 15 and are pressed against the outer faces of the composite web composed of the webs 8, 9 and 10. The bringing together of the webs 8, 9 and 10 and the facing webs 17 of cellophane provides a continuously formed composite strip.

Figures 4, 17, 18, 19, 20:
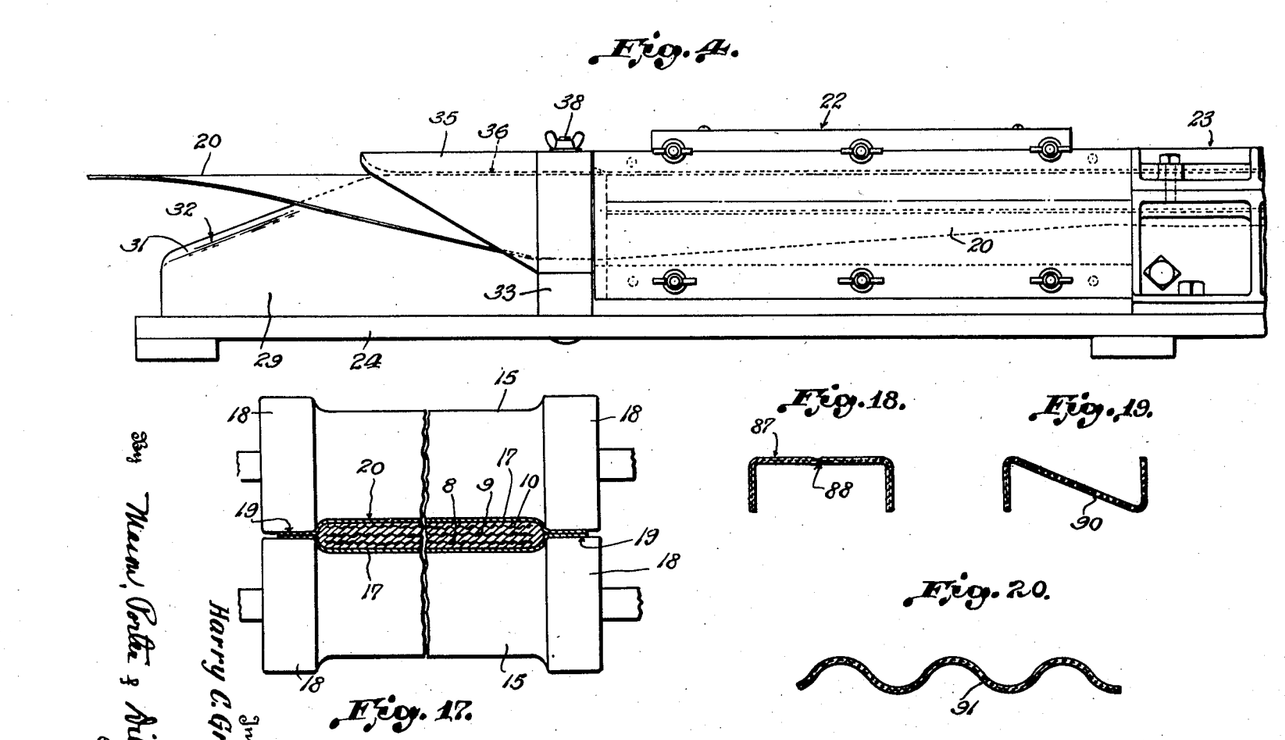
Figure 4 is an enlarged fragmentary side elevation illustrating the shaping or preforming mold section and an attached portion of the form maintaining and curing mold section.
Figure 17 is an enlarged detail vertical cross section taken through the strip assembling rolls and the assembled impregnated web formed strip passing therebetween.
Figure 18 is a detail cross section illustrating how the invention can be practiced in the formation of various shapes such as channel shapes, U-shapes or angles, the latter being formed by longitudinally slitting the shape shown in this figure.
Figure 19 is a detail cross section illustrating how the invention can be practiced in forming a Z-shape.
Figure 20 is a detail cross section illustrating how the invention can be practiced in forming a corrugated shape.
Figure 5:
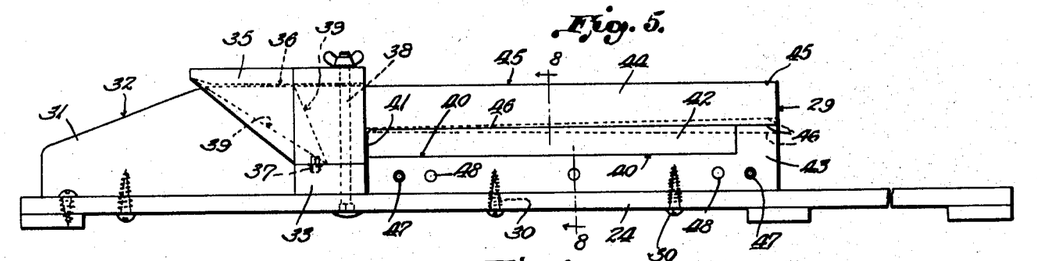
Figure 5 is an enlarged detail side elevation illustrating the male member of the shaping or preforming mold section, the bell mouth being shown in place thereon.
Figure 6:
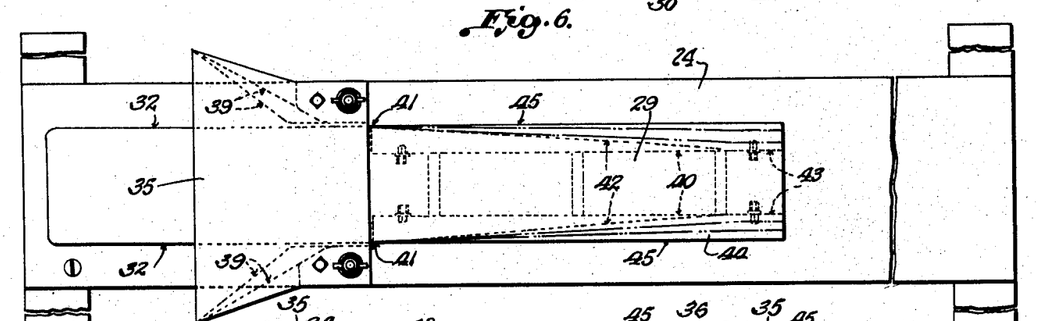
Figure 6 is a plan view of the parts shown in Figure 5.

It will be noted by reference to Figure 17 of the drawings that the cellophane webs 17 are slightly wider than the fabric webs 8, 9 and 10, and that the assembling rolls 15 are provided with end enlargements 18 disposed to engage the marginal edge portions of the cellophane webs 17 where they extend beyond the fabric webs and press them together as at 19. Obviously some of the resin impregnating the fabric webs will be exuded between the contacting marginal edge portions of the cellophane webs 17, and said extending marginal edge portions will be sealed together to provide an air excluding, movement facilitating cellophane envelope encasing the composite webs 8, 9 and 10. The composite strip composed of the cellophane encased webs 8, 9 and 10 is generally designated 20. It is to be understood that while the cellophane encasement of the composite fabric web is highly desirable, the cellophane can be dispensed with in installations wherein the article molding devices are so constructed as to suitably exclude air and the quality and condition of the resin is such as to permit drawing of the article through the molding devices continuously without a movement facilitating encasement such as the cellophane.

Figure 1B:
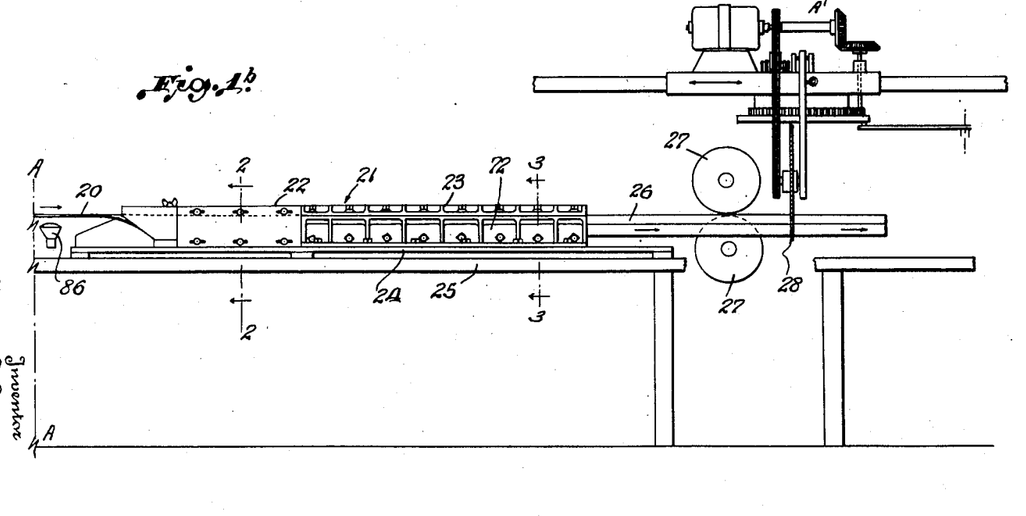

It will be apparent by reference to Figure 1ª and 1ᵇ that the composite strip 20 formed in the manner hereinbefore described is continuously fed through molding devices which are effective to first gradually and progressively draw the strip into the desired cross sectional shape while the resin is in fluid conditon, and then to maintain said desired shape and effect a curing and setting of the resin while the strip is continuously travelling. The molding devices are generally designated 21 and include the shaping or preforming section 22 and the form maintaining and curing section 23. The molding devices are mounted on a base 24 which is in turn supported on a table or other appropriate supporting means 25. The formed and cured article continuously passing through the molding devices is generally designated 26 and is drawn through the molding devices by suitably shaped draw rolls 27 and is then cut into articles of a desired length. While the cutting of the continuously formed article may be performed in any approved manner, it is preferred that the articles be cut into desired length while they are being continuously fed from the molding devices in the manner illustrated in Figure 1ᵇ. Any approved cutoff mechanism may be employed for this purpose, such as a traversing saw mounted on a reciprocating carriage so moved as to be travelling at the same speed as the continuously formed article at the time the cutting traverse of the saw is effected. Since the cutoff mechanism per se forms no part of the present invention, it is deemed unnecessary to illustrate the same in detail in this disclosure.

It will be apparent by reference to Figures 4 through 15 that the shaping or preforming section 22 of the molding devices includes a male member which is illustrated in detail in Figures 5 to 8 and includes an upright body 29 which is secured as at 30 to the base 24. The body 29 has a downwardly curved receiving nose portion 31 equipped with well rounded upwardly and laterally presented corners 32. A support block 33 is mounted in upstanding relation on the base 24 at each side of the body 29 and spaced from said body as at 34. A U-shaped bell mouth 35 straddles the upright body 29 with the inner faces thereof spaced slightly away from said body as at 36 to provide a shaping passage through which the composite strip 20 can be drawn. The bell mouth is supported on the blocks 33, being positioned thereon by the dowel equipments 37 and secured in position by bolts 38. It will be apparent by reference to Figures 4, 5, 6 and 7 of the drawings that the bell mouth is shaped to include gradually sloping shaping surfaces 39 for engaging and shaping the incoming composite strip 20 over the top and side portions of the upright male member body 29.

At, or approximately at, the terminus of the bell mouth 35, the lower side walls of the upright body 29 are undercut in parallel relation as at 40, and above the undercut but below the top surface of said body there starts a side wall cut away commencing at 41 and providing converging side walls 42 merging into parallel wall portions 43 at the end of the upright body 29. The provision of the converging side walls 42 leaves a sort of T-head 44 of gradually increasing undercut at the top of the upright body 29 and having upwardly and laterally presented well rounded corners 45, and downwardly and laterally well rounded corners 46 of gradually increasing radii.

The undercut walls 40 are equipped with positioning dowels 47 and cross apertures 48, the purpose of which will become apparent as this description progresses.

The upright body portion 29 of the male shaping member is surrounded by a similar shaping portion composed of matching right and left half sections 49 and 50. Since the sections 49 and 50 are matching sections, it is deemed desirable to describe only one thereof in detail, and other than the general reference characters will be applied similarly on the illustrations of both sections. The matching similar sections are illustrated in Figures 9 through 15.

Each of the matching similar sections 49 and 50 includes a side portion 51 and an inwardly extending top portion 52, the top portions of the sections being proportioned to abut medially over the upright male body 29, and being secured together by bolts 53 passed through apertures in said top portions. The side portions 51 are secured at their lower ends to the upright male body 29 through the medium of bolts 54 passing through suitable apertures in said side members and the aperture 48 in the body 29, suitable placing dowel equipments 55 being provided for accurately placing the sections 49 and 50 with relation to the upright male body 29. The half sections 49 and 50 have gradually converging side walls 57 disposed in close parallel spaced relation to the converging male body side walls 42, and the inwardly and upwardly presented well rounded corners 58 of gradually increased radii on said side walls 57 form shaping shoulders 59 which extend in spaced relation under the male member T-head 44, and T-head receiving recesses defined by well rounded corners 60.

While the invention can be practiced in the continuous formation of articles of various shapes, the illustration herein made has to do with one of the more complicated shapes in the form of a T-head channel through which articles such as shells may be rolled. It will be apparent that the composite strip 20 when drawn through the shaping or preforming molding device section 22 hereinabove described will have its lateral edges first drawn downwardly over the nose portion 31 and then about and under the T-head 44, thereby to be gradually and progressively shaped into the open T-head constituting the desired shape of the article produced by the shaping cavity terminating at the end of the section 22. The shape of the cavity will be apparent by reference to Figures 2 and 7 of the drawings.

The form maintaining and curing mold section 23 includes a male or main body which is hollow and of general T-shape including a base 61, parallel upstanding and laterally spaced side walls 62, a top wall 63, and lateral hollow head extensions 64 having well rounded corners 65. It will be apparent by reference to Figure 3 that the T-shape male or main body portion of the section 23 is formed to present a longitudinal groove 66 at the juncture between the T-head portion and each side wall, and also a longitudinal groove 67 directly above each groove 66 in the top wall 63. The male or main body portion also is equipped with side pads 68 equipped with placer ribs 69, each having a threaded tap therein.

In order to cooperate with the male member of the curing mold section 23 in forming side cavities, side members 70 and 71 are provided. The side members 70 and 71 are constructed in the same manner and a detailed description of one thereof will suffice for both.

Figure 3:
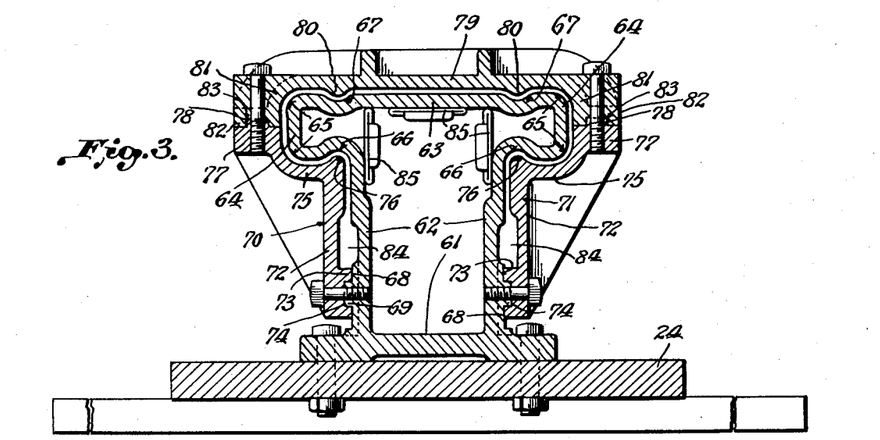
Figure 3 is an enlarged vertical cross section taken on the line 3—3 on Figure 1$^b$.

Each side member 70 or 71 includes a side wall 72 having a longitudinal face for opposing the male member side pads 68 and which is longitudinally grooved as at 74 to receive the placer ribs 69 of said pads at the respective side of the mold section. The side walls are secured in place against the pads 68 by screws which pass through the side members and are threaded into the taps in the ribs 69. Each side member includes a horizontal wall 75 extending outwardly under the male head and equipped with a longitudinal rib 76 for fitting in or cooperating with the respective head groove 66 in spaced relation. Each wall portion 75 is provided with a longitudinally extended rib 78, and the mold section 23 is completed by a top member 79 having longitudinal ribs 80 for fitting in or cooperating in spaced relation with the grooves 67, and side walls spaced from the male head sides and terminating in an attaching ledge 82 which is longitudinally grooved as at 83 to receive the ribs 78 of the side members 70 and 71. The top member may be secured to the side members in any approved manner, as by securing screws or the like, and it will be apparent by reference to Figure 3 of the drawings that the male or main body portion of the curing mold section 23, the side members 70 and 71, and the top member 79 are so spaced and cooperatively mounted that they provide the desired T-shape cavity in which to receive the shaped, resin impregnated strip and maintain the shape thereof as the strip is heat cured while passing continuously through said mold section. The molding faces of the cooperating parts of the mold section 23 may be so shaped as to provide enlargements 84 below the shape maintaining and curing cavities, as shown in Figure 3. The curing mold section may be heated in any approved manner, as by use of electrical resistance heaters 85 secured in any approved manner within the male or main hollow body, and it is also preferred that the composite strip be heated before it is introduced into the shaping or preforming mold section 22 in the manner clearly illustrated in Figures 1b and 4. The last named heating means serves to assure fluidity of the resin impregnation during the initial shaping or preforming of the strip and may take the form of infra red ray producing lamps 86 disposed just ahead of the receiving nose portion 31 of the shaping or preforming section 22 of the molding devices.

Figure 21:
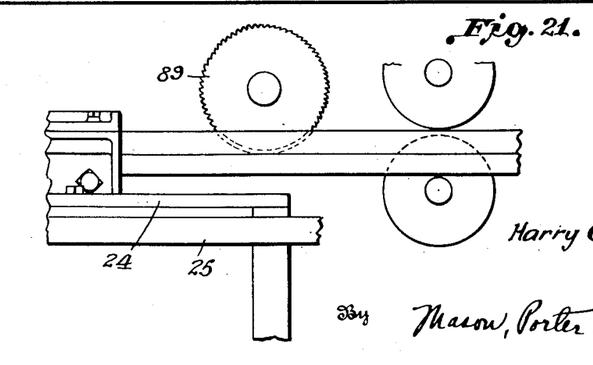
Figure 21 is a fragmentary diagrammatic view illustrating how a shape formed for example as shown in Figure 17 may be longitudinally slit or cut to form other shapes, such as angles in the case of the particular example illustrated.

As before stated, the invention can be practiced in the formation of variously shaped articles of continuous length such as channel shapes, U-shapes or angles, Z-shapes, corrugated shapes or the like. In Figure 18 of the drawings, there is illustrated a continuously formed article which may be considered of channel shape, U-shape, or of the shape of two angles or L's, the latter being formed by longitudinally slitting the channel or U-shaped element illustrated in Figure 18 in the manner diagrammatically indicated in Figure 21. It will be apparent that by forming an article in the manner illustrated in Figure 18, channel shapes or U-shapes will be provided according to the width of the base or connecting portion of the shaping and molding channels, and by longitudinally slitting such shapes, the article continuously formed in the shape of a channel or a U may be longitudinally slit to provide two angles or L-shaped articles. The channel or U before longitudinally slitting is indicated at 87 and the longitudinal slitting referred to may be along the line 88 and may be accomplished by a saw as indicated at 89 in said Figure 21.

In Figure 19 of the drawing, there is illustrated a Z-shape 90 formed in accordance with the invention, and Figure 20 illustrates how the invention can be practiced in forming a corrugated shape 91.

Figure 2:
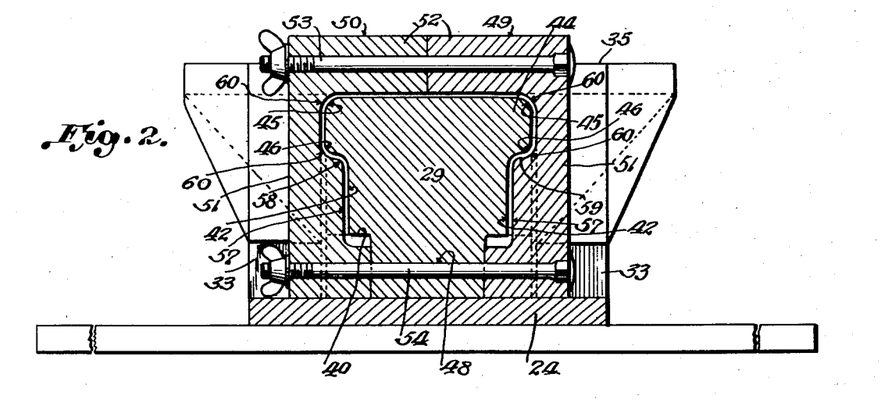
Figure 2 is an enlarged vertical cross section taken on the line 2—2 on Figure 1$^b$.
Figure 7:
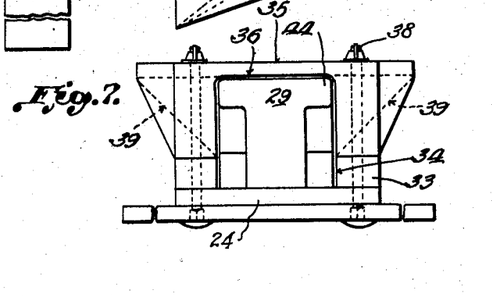
Figure 7 is a right end elevation of the parts shown in Figure 5.
Figure 8:
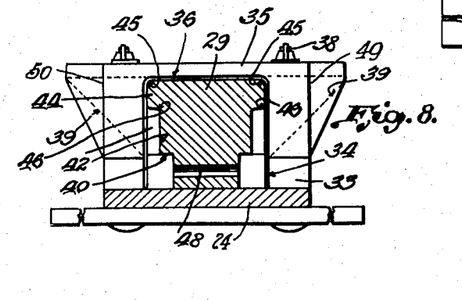
Figure 8 is a detail vertical cross section taken on the line 8—8 on Figure 5.
Figure 9:
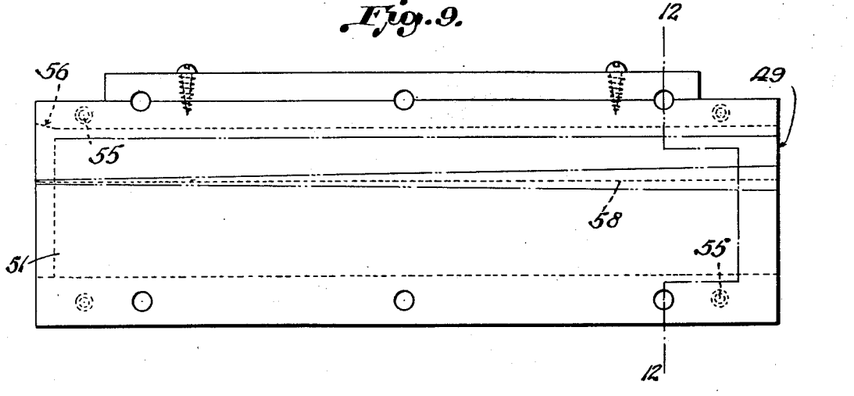
Figure 9 is an outside elevation of the right hand female part of the shaping or preforming mold section.
Figure 10:
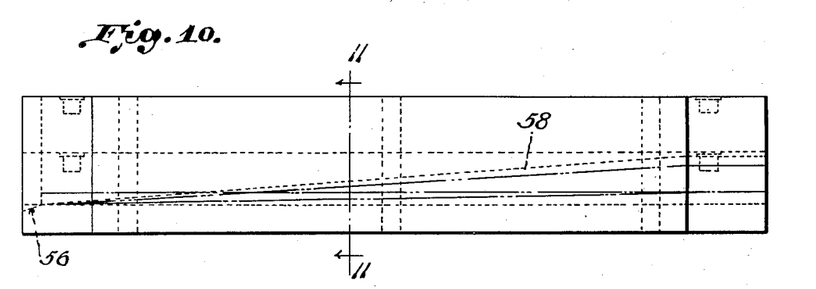
Figure 10 is a plan view of the parts shown in Figure 9.
Figure 11:
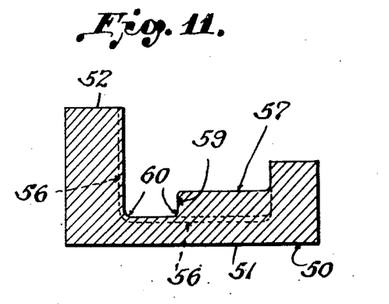
Figure 11 is a detail vertical cross section taken on the line 11—11 on Figure 10.
Figure 12:
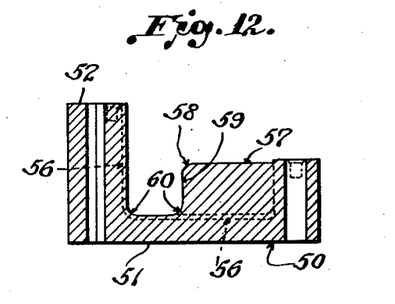
Figure 12 is a detail vertical cross section taken on the line 12—12 on Figure 9.
Figure 13:
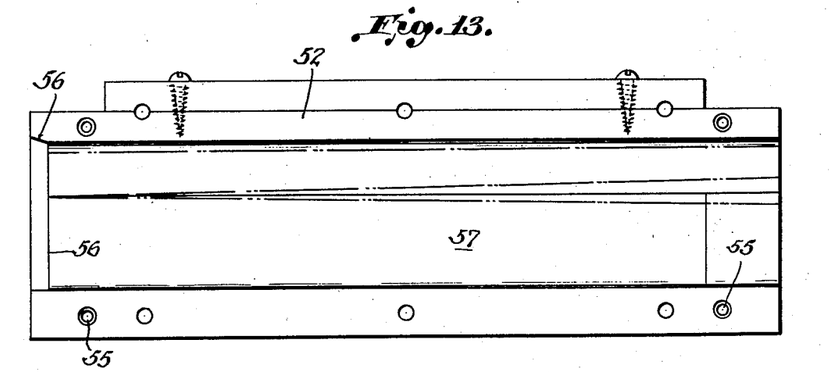
Figure 13 is an inner face view of the left hand female part of the shaping or preforming mold section.
Figure 14:
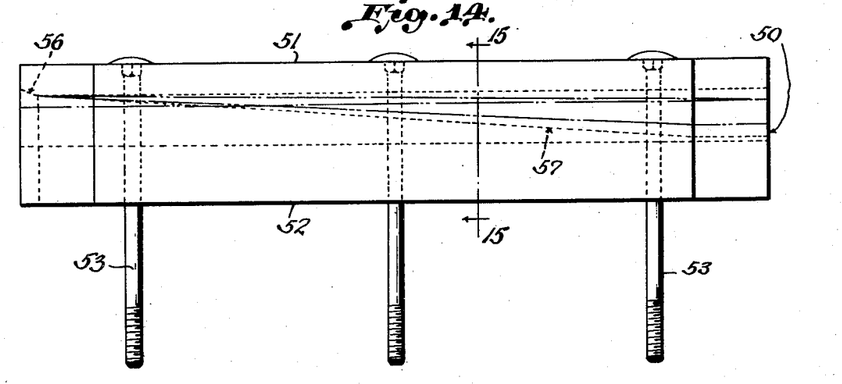
Figure 14 is a plan view of the part shown in Figure 13.
Figure 15:
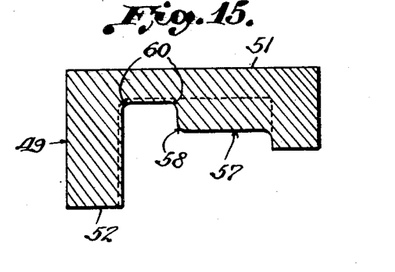
Figure 15 is a detail vertical cross section taken on the line 15—15 on Figure 14.
Figure 16:
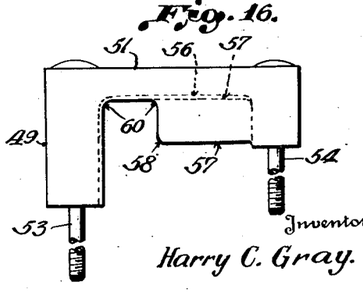
Figure 16 is an end elevation of the section shown in Figure 13.

It is to be understood that as the composite strip 20 of impregnated fabric webs and the cellophane envelope is drawn through the preshaping or preforming section 22 of the molding devices, it will be gradually smoothed over and shaped about the T-head portion of the upright male body 29 and be held against parallel wall portions 43 in the intended shape illustrated as an example of embodiment of the invention in Figures 2 and 7 of the drawings. As the shaped or preformed composite strip passes into the form maintaining or curing mold section 23 the upper and lower portions of the T-head shaping of the strip will engage between the groove and rib equipments 66, 76 and 67, 80, and these equipments will serve not only to shape longitudinal, inwardly directed ribs in the channel shaped article produced in the molding section illustrated in detail in Figure 3 but will also serve to draw tight the T-head portion of the article being continuously formed. While the article is passing through the section 23 of the molding devices, the desired shape thereof will be maintained and the resin will be heat cured so as to harden and set the resin in the desired shape of the article. It is to be understood that the shaping and shape maintaining cavities in the molding sections will be changed accordingly as the apparatus is set up for the making of the various selected shapes of articles that can be formed in the apparatus and by practicing the novel method herein disclosed.

The cellophane encasement or envelope formed about the composite strip serves to exclude air from the impregnated strip and also greatly facilitates movement of the strip into and through the molding devices. While the cellophane envelope may be dispensed with in molding devices where air is suitably excluded, this composite web envelope means will be found very desirable during the passage of the composite web or strip through that portion of the molding devices wherein the resin starts to set up. The cellophane also acts as a form of mold for the impregnated, composite web or strip and assures the provision of a smooth exterior on the articles continuously formed in accordance with the present invention. After the articles have passed through the molding devices the cellophane envelope may be stripped off to expose the continuously smooth external surfaces of the molded article. As previously explained, the muslin web or webs are presented at the surface or surfaces of the article which are to be outwardly presented and which it is desired should present a very smooth external appearance.

As previously stated, the resin with which the impregnation is effected is of the heat hardening type which sets or cures upon heating, without employment of high pressures, to provide a shaped body of the form established by application of only light mold pressure against the continuously travelling strip. Such "contact pressure resins" are commercially available.

The initial application of heat to the composite travelling web, that is to say the application of heat just prior to the entry of the strip to the preshaping or preforming station 22 is at a relatively low rate, say for example 140° F., whereas the application of heat effective to cure the continuously travelling, resin impregnated strip in the desired shape is at a higher rate, say for example 180° F. It has been found that for a two minute cure the composite strip can be drawn through the molding devices at a rate of ten feet per minute. Since the curing speed depends upon mold length and the type of resin employed, it will be apparent that by lengthening the mold the curing speed will be correspondingly increased.

It is to be understood that the apparatus and method step disclosures herein made are example disclosures, and that said steps and structure may be variously modified without departing from the spirit and scope of the invention as defined in the appended claims.

I claim:

1. A method of continuously forming articles from a resin impregnated fabric which comprises the steps of impregnating a continuously travelling flat web of the fabric with a heat hardening contact pressure resin, passing the impregnated flat web through a forming mold for gradually and progressively changing the shape of said web into the desired cross sectional shape while the resin is in fluid condition, and maintaining the shaped web in said cross sectional shape and heating the same as it is travelling for curing and setting the resin.

2. A method of continuously forming articles from a resin impregnated fabric which comprises the steps of impregnating a continuously travelling web of the fabric with a heat hardening contact pressure resin, encasing the travelling web in an air excluding and travel facilitating cellophane envelope, passing the impregnated web through a forming mold for gradually and progressively shaping said web into the desired cross sectional shape while the resin is in fluid condition, maintaining the shaped web in said cross sectional shape and heating the same as it is travelling for curing and setting the resin, and tearing away said cellophane envelope.

3. A method of continuously forming articles from a resin impregnated fabric which comprises the steps of assembling webs impregnated with a heat hardening contact pressure resin into a single continuous strip, encasing the strip in an air excluding and travel facilitating cellophane envelope, passing the impregnated strip through a forming mold for gradually and progressively shaping the strip into the desired cross sectional shape while the resin is in a fluid condition, maintaining the shaped strip in said cross sectional shape and heating the same as it is travelling for curing and setting the resin, and tearing away said cellophane envelope.

4. A method of continuously forming articles from a resin impregnated fabric which comprises the steps of assembling webs impregnated with a heat hardening contact pressure resin into a single continuous strip, encasing the strip in an air excluding and travel facilitating cellophane envelope, passing the impregnated strip through a forming mold for gradually and progressively shaping the strip into the desired cross sectional shape while the resin is in a fluid condition, maintaining the shaped strip in said cross sectional shape and heating the same as it is travelling for curing and setting the resin, cutting the cured strip into articles of a desired length, and tearing away said cellophane envelope from the individual articles.

5. A method of continuously forming articles from a resin impregnated fabric which comprises the steps of assembling webs impregnated with a heat hardening contact pressure resin into a single continuous strip, said webs comprising at least one cotton duck web and at least one externally presented muslin web, encasing the strip in an air excluding and travel facilitating cellophane envelope, passing the impregnated strip through a forming mold for gradually and progressively shaping the strip into the desired cross sectional shape while the resin is in a fluid condition, maintaining the shaped strip in said cross sectional shape and heating the same as it is travelling for curing and setting the resin, and tearing away said cellophane envelope.

6. A method of continuously forming articles from a resin impregnated fabric which comprises the steps of causing a multiple of fabric webs to individually travel through and be impregnated in a bath of a heat hardening contact pressure resin, bringing said impregnated webs together to form a single flat continuous strip, causing said flat strip to continuously travel through a forming mold effective to gradually and progressively change the shape of the strip into the desired cross sectional shape while the resin is in a fluid condition, and maintaining the shaped strip in said cross sectional shape and heating the same as it is travelling for curing and setting the resin.

7. A method of continuously forming articles from a resin impregnated fabric which comprises the steps of causing a multiple of fabric webs to individually travel through and be impregnated in a bath of a heat hardening contact pressure resin, bringing said impregnated webs together to form a single flat continuous strip, applying heat to the strip just prior to commencement of the molding thereof to assure fluidity of the resin impregnation during shaping of said strip, causing said flat strip to continuously travel through a forming mold effective to gradually and progressively changing the shape of the strip into the desired cross sectional shape while the resin is in a fluid condition, and maintaining the shaped strip in said cross sectional shape and heating the same as it is travelling for curing and setting the resin.

8. A method of continuously forming articles from a resin impregnated fabric which comprises the steps of causing a multiple of fabric webs to individually travel through and be impregnated in a bath of heat hardening contact pressure resin, bringing said impregnated webs together to form a single continuous strip, applying a continuous web of cellophane to each face of the resin impregnated strip with the cellophane marginal edges extending laterally beyond said strip, and sealing together the marginal edges of the cellophane webs outwardly of the marginal edges of said strip to encase said strip in an air excluding and travel facilitating cellophane envelope, causing the cellophane encased and resin impregnated strip to continuously travel through a forming mold effective to gradually and progressively shape the strip into the desired cross sectional shape while the resin is in a fluid condition, and maintaining the shaped strip in said cross sectional shape and heating the same as it is travelling for curing and setting the resin.

9. A method of continuously forming articles from a resin impregnated fabric which comprises the steps of impregnating a continuously travelling flat web of the fabric with a heat hardening contact pressure resin, passing the impregnated flat web through a forming mold for gradually and progressively changing the shape of said web into a multiple of desired cross sectional shapes joined along longitudinal lines while the resin is in fluid condition, maintaining the shaped web in said cross sectional shape and heating the same as it is travelling for curing and setting the resin, longitudinally slitting the cured strip to separate the multiple of strip shapes, and cross cutting the multiple of strip shapes into articles of a desired length.

10. Apparatus for continuously forming articles from resin impregnated fabric comprising, means for providing a supply of flat fabric web, a bath of a heat hardening contact pressure resin, molding means having continuous shaping and shape maintaining cavities therein including a shaping portion effective to gradually and progressively change the flat shape of said web when fed therethrough to the desired cross sectional shape and a continuous shape maintaining portion effective to maintain said desired cross sectional shape of the web as it is fed therethrough, means for feeding the flat web through said molding means and said bath, and means for heating the shape maintaining portion of the molding means to cure and set the resin while the resin impregnated web is passing therethrough.

11. Apparatus for continuously forming articles from resin impregnated fabric comprising, means for providing a supply of flat fabric web, a bath of a heat hardening contact pressure resin, molding means having shaping and shape maintaining cavities therein including a shaping portion effective to gradually and progressively change the shape of said web when fed therethrough to the desired cross sectional shape and a shape maintaining portion effective to maintain said desired cross sectional shape of the web as it is fed therethrough, means for feeding the flat web through said molding means and said bath, means for heating the impregnated web just prior to entry into the molding means to assure fluidity of the resin impregnation during shaping of the web, and means for heating the shape maintaining portion of the molding means to cure and set the resin while the resin impregnated web is passing therethrough.

12. Apparatus for continuously forming articles from resin impregnated fabric comprising, means for providing a supply of flat fabric web, a bath of a heat hardening contact pressure resin, molding means having shaping and shape maintaining cavities therein including a shaping portion effective to gradually and progressively change the shape of said web when fed therethrough to the desired cross sectional shape and a shape maintaining portion effective to maintain said desired cross sectional shape of the web as it is fed therethrough, means for feeding the flat web through said molding means and said bath, means for heating the web just prior to passage thereof through the resin bath to facilitate impregnation of the web, means for heating the impregnated web just prior to entry into the molding means to assure fluidity of the resin impregnation during shaping of the web, and means for heating the shape maintaining portion of the molding means to cure and set the resin while the resin impregnated web is passing therethrough.

13. Apparatus for continuously forming articles from resin impregnated fabric comprising, means for providing a supply of flat fabric web, a bath of a heat hardening contact pressure resin, molding means having shaping and shape maintaining cavities therein including a shaping portion effective to gradually and progressively change the shape of said web when fed therethrough to the desired cross sectional shape and a shape maintaining portion effective to maintain said desired cross sectional shape of the web as it is fed therethrough, means for feeding the flat web through said molding means and said bath, means for bringing about the encasement of the web in cellophane to form an air excluding and travel facilitating envelope thereabout prior to entry of the web into the molding means, and means for heating the shape maintaining portion of the molding means to cure and set the resin while the resin impregnated web is passing therethrough.

HARRY C. GRAY.

REFERENCES CITED

The following references are of record in the file of this patent:

UNITED STATES PATENTS

| Number | Name | Date |
|---|---|---|
| 1,284,296 | Frederick | Nov. 12, 1918 |
| 1,323,039 | Frederick | Nov. 25, 1919 |
| 1,909,513 | Agar | May 16, 1933 |
| 2,015,445 | Bierer et al. | Sept. 24, 1935 |
| 2,211,742 | Halliwell | Aug. 13, 1940 |
| 2,414,125 | Rheinfrank | Jan. 14, 1947 |
| 2,433,965 | Upson | Jan. 6, 1948 |
| 2,496,911 | Green | Feb. 7, 1950 |